Oct. 6, 1931.   P. FAVOUR   1,826,695
LIGHT PROTECTED MOTION PICTURE FILM
Filed June 27, 1929
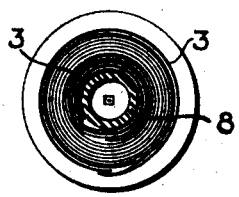
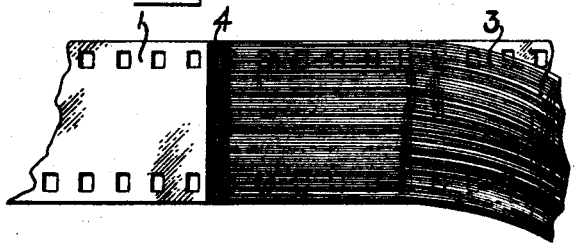
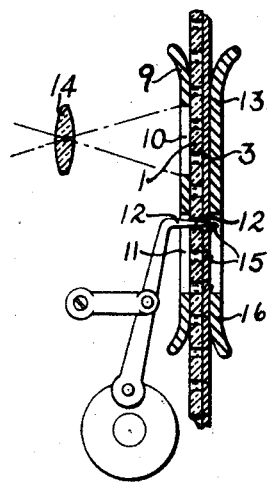
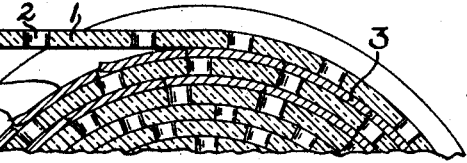
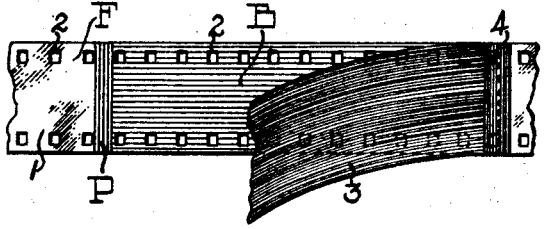
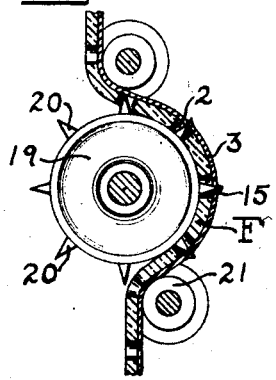
Inventor
Paul Favour
By
Attorney Patented Oct. 6, 1931

1,826,695

UNITED STATES PATENT OFFICE

PAUL FAVOUR, OF ROCHESTER, NEW YORK, ASSIGNOR TO EASTMAN KODAK COMPANY, OF ROCHESTER, NEW YORK, A CORPORATION OF NEW YORK

LIGHT PROTECTED MOTION PICTURE FILM

Application filed June 27, 1929. Serial No. 374,248.

This invention relates to photography and more particularly to a means for preventing light from entering packages of perforated picture film. One object of my invention is to provide a light protective covering for perforated picture film in which the sheet forming the protective cover is unperforated. Another object of my invention is to provide a light protective covering which is made of substantially opaque material and which is adapted to be unwound with a strip of the perforated material. Another object of my invention is to provide a light protective covering of substantially opaque material which is readily frangible and which is adapted to pass through a pulldown mechanism in a camera. Another object of my invention is to provide a light protective sheet which will be ruptured in passing through a pulldown mechanism and which is of a material permitting the ruptures to be smoothed out when again wound into convolutions on a film spool. Still another object of my invention is to provide a supplementary light protective covering for motion picture film which may be attached to any of the well known types of film strips and which will pass through the standard types of motion picture apparatus and other objects will appear from the following specification, the novelty features being particularly pointed out in the claims at the end thereof.

Coming now to the drawings wherein like references denote like parts throughout:

Fig. 1 is a plan view of a film strip about to be wound on a film spool, the strip being equipped with a light protective sheet constructed in accordance with and embodying a perforated form of my invention;

Fig. 2 is an enlarged side elevation partly in section of a coil of perforated strip material in convolutions of which there are wound light protective strips;

Fig. 3 is a greatly enlarged detail plan view of a portion of a perforated film strip equipped with an unperforated covering;

Fig. 4 is an enlarged detail section through a typical camera film gate and showing a portion of a pulldown mechanism for moving a film strip equipped with a protective covering;

Fig. 5 is an enlarged detail section through a portion of a film spool upon which is perforated film and protective covering are wound after passing through a pulldown mechanism;

Fig. 6 is an enlarged detail plan view of a different type of perforated film band equipped with an unperforated light protective covering;

Fig. 7 is an enlarged detail partially in section showing a film end protective covering passing over another type of pulldown mechanism; and Fig. 8 is a greatly enlarged detailed sectional view showing a film equipped with a ruptured protective covering.

It is sometimes found difficult to prevent light from leaking into film packages in which perforated film, usually equipped with perforated leader and tail strips are packed unless the leader and tail strips are quite long. It occasionally happens that certain apertures in different convolutions come either into registration or substantially into registration so that light leaks through these apertures to the light-sensitive film.

In order to prevent this light leakage and in order to reduce the length of the usual leader strips, I have provided a supplementary light protective cover adapted to be wound in convolutions of the perforated strip.

I prefer to make these supplementary light protective strips of substantially opaque readily frangible material such as thin paper of dark color, red or black is preferable. I also prefer to have the protective strip made of a somewhat springy material so that when the unperforated protective covering passes through the pulldown mechanism of a motion picture machine and is ruptured thereby, the rough edges of the ruptured portion may tend to spring back to their original position. If they do not spring back, the rollers about which the strip material passes in photographic machines and the act of winding the protective covering into convolutions upon a take-up spool tend to smooth out the ruptured portions of the protective covering so that comparatively small apertures remain in the material.

In Fig. 1 I have shown a typical application of my invention. In this figure there is a long strip of film 1 having the usual perforations 2 by which it is moved through the motion picture apparatus. The apertured material, as best indicated in Fig. 3, extends underneath a light protective covering strip 3 which may be attached to the perforated strip by means of a suitable paster 4.

My supplementary light protective covering strip may be applied either directly to a photographic film strip or to one of the usual perforated protective strips which are attached to the perforated film, such film being commonly used for amateur motion picture film work.

The pasters 4 should be attached to that end of the perforated band 1 which is threaded into the pulldown mechanism of the motion picture camera and the opposite end 5 should not be attached to the strip. This permits the protective strip 4 to move smoothly through the pulldown mechanism with the perforated strip without buckling and since the strip 3 is of quite thin material, it will pass through the standard motion picture machines now on the market.

The width of the strip 3 is preferably the same as that of the perforated strip 1 so that the edges of the two strips will contact or will come close to the flanges 6 of a film spool designated broadly as 7 in Fig. 1 when the strip material is unwound from the spool.

As best shown in Fig. 2 the length of the protective strips 3 should be sufficient to encircle at least once the convolutions of material wound upon a spool 7. As indicated in this figure the outer covering 3 overlaps only a short distance, while the inner covering 3 passes approximately twice around the film spool core 8. Since the strip 3 which lies on the outside on the supply spool will lie on the inside of the take-up spool, it is preferable to have both of these strips 3 of the same length.

Referring to Fig. 4 there is diagrammatically illustrated a film gate comprising a front plate having an exposure area 10 and a slot 11 through which a pull down claw 12 of any well known type may pass. A presser plate 13 holds the strips 1 and 3 closely together as they pass through the gate. An objective 14 is diagrammatically illustrated as projecting an image on the strip 1.

The pulldown claw 12 is shown as engaging a film perforation 2 and at the same time it is rupturing at 15 the protective covering 3. As the ruptured portion of the strip 3 passes through the lower edge 16 of the film gate it will be smoothed down so that the rupture will be at least partially pressed together. After being wound on a take-up spool, as indicated at Fig. 5, the ruptured portions are pressed flat and practically closed as indicated at Fig. 8.

While, of course, the rupture is not completely covered the remaining aperture in the protective covering 3 is so slight that very little light leak occurs and the chance of having a number of these very small apertures in registration after winding the strip material upon a reel is comparatively slight.

In Fig. 6 the strip material 1 consists of a film strip F attached by means of a paster P to backing paper B, this strip material being the type sold for amateur purposes as 16 mm. film. The protective covering may be applied to the backing paper B by means of a paster 4 which attaches the leader end of the protective covering 3 to the backing paper.

In some commercial forms of motion picture film the backing paper is omitted and the film strip is dyed to prevent light from entering. My invention can be applied to such a roll by attaching the protective strip 3 by paster 4 directly to the dyed film.

In Fig. 7 I have shown the pulldown mechanism as consisting of a sprocket 19 having teeth 20 adapted to engage the apertures 2 of a film F and adapted to rupture at 15, the protective covering 3. The film passes beneath a film guiding roller 21 to the sprocket which may be driven by any well known intermittent type of movement such as a Geneva movement.

With the forms of my invention as described above practically any type of daylight loading film spool using perforated film may be equipped to materially reduce the amount of light which may leak through the film covering chiefly through the apertures by which the strip material may be moved. The size of a film spool equipped with my light protective covering is not materially altered and by providing a thin material which is readily frangible, very little additional power is required to drive through the film and covering.

Since the light protective coverings lie at or near the ends of the perforated strip, it is not material whether or not the pulldown mechanism is moving at its usual constant speed during the time the protective strip is moving past the film gate because at that time the usual picture areas on the film have passed the exposure aperture.

It should be noted that the addition of this supplementary light protective covering can be used to materially reduce the length of the perforated light protective covering which forms a part of the standard daylight loading film cartridge.

While this is not so material for the comparatively long rolls of motion picture film it is very useful for the shorter rolls of perforated film sold for making either a short series of motion pictures or single exposures on relatively short lengths of film.

Where I refer to "film band" in the claims I mean either the film band alone, or the film band with leader and/or tail strips which are perforated. The leader strip and/or tail strips may be of paper or film base material.

Having thus described my invention, what I claim as new and desire to secure by Letters Patent is:

1. In a protective covering for spools of motion picture film, the combination with a film band having apertures therein, of a light protecting covering adapted to be interwound with said film, said covering being normally unperforated, but capable of being perforated as a film moving mechanism advances the film through contact with the film perforations.

2. In a protective covering for spools of motion picture film, the combination with a perforated film strip of a light protecting covering adapted to lie against one side of the perforated strip material and to cover the perforations therein, said light protecting cover comprising a relative thin sheet of substantially opaque material.

3. In a protective covering for spools of motion picture film, the combination with a perforated film strip of a light protecting covering adapted to lie against one side of a light protecting covering of the perforated strip material and to cover the perforations therein, said light protecting cover comprising a substantially opaque sheet of readily frangible material.

4. In a protective covering for spools of motion picture film, the combination with a perforated film strip of a light protecting covering adapted to lie against one side of the perforated strip material and to cover the perforations therein, said light protecting cover comprising a thin, substantially opaque sheet of paper of a width comparable with that of the strip material.

5. In a protective covering for spools of motion picture film, the combination with a long strip of perforated material including perforated film, of protective covering for the ends of said strip material comprising lengths of unperforated readily frangible, substantially opaque material lying against the ends of the strip whereby light is prevented from passing freely through said apertures.

6. In a protective covering for spools of motion picture film, the combination with a long strip of perforated material including perforated film, of protective covering for the ends of said strip material comprising lengths of unperforated, readily frangible, substantially opaque material lying against the ends of the strip, the length of said strips being sufficient to encircle said convolutions of strip material wound on said spool at least once.

7. In a protective covering for spools of motion picture film, the combination with a long strip of perforated material including perforated film, of protective covering for the film including a strip of substantially opaque unperforated material, a paster attaching said material to said perforated film overlying a portion of said perforated material and overlying the perforations therein.

8. In a protective covering for spools of motion picture film, the combination with a perforated film band having light retarding ends, of a supplementary light protective covering including an unperforated strip adapted to lie against and cover the perforations of the film band to retard the leakage of light therethrough.

9. In a protective covering for spools of motion picture film, the combination with a perforated film band having light retarding ends, of a supplementary light protective covering including an unperforated strip adapted to lie against and cover the perforations of the film band to retard the leakage of light therethrough and pasters for attaching the supplementary light protective covering to the perforated film band.

10. In a protective covering for spools of motion picture film, the combination with a perforated film band having light retarding ends, of a supplementary light protective covering including an unperforated strip adapted to lie against and cover the perforations of the film band to retard the leakage of light therethrough and pasters for attaching the supplementary light protective covering to the perforated film band, said pasters attaching one end only of each supplementary light protective covering to said film band.

11. In a protective covering for film cartridges, the combination with a spool, of a plurality of convolutions of perforated film band wound therein, a light protective covering including an unperforated, readily frangible, substantially opaque strip approximating the width of the film strip, said covering encircling said film spool at least once.

12. In a protective covering for film cartridges, the combination with a spool, of a plurality of convolutions of perforated film band wound therein, a light protective covering including an unperforated, readily frangible, substantially opaque strip approximating the width of tht film strip wound between outer convolutions of said film band and being of a length sufficient to encircle said film spool one or more times.

13. The method of protecting perforated motion picture film from light fog comprising spooling a perforated motion picture film band with at least one convolution of film covered with an unperforated opaque sheet, running said film and sheet through camera and pulldown, whereby the unperforated sheet is ruptured by said pulldown mechanism and winding convolutions of film and the ruptured protective covering together pressing the ruptured surfaces together.

Signed at Rochester, New York, this 22nd day of June, 1929.

PAUL FAVOUR.